United States Patent
Kaneko

(10) Patent No.: US 6,856,412 B1
(45) Date of Patent: Feb. 15, 2005

(54) IMAGE FORMING SYSTEM, IMAGE FORMING APPARATUS, CONTROL METHOD THEREOF, IMAGE FORMING METHOD, AND STORAGE MEDIUM

(75) Inventor: Satoshi Kaneko, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 949 days.

(21) Appl. No.: 09/722,649

(22) Filed: Nov. 28, 2000

(30) Foreign Application Priority Data

Nov. 30, 1999 (JP) .......................................... 11-341397

(51) Int. Cl.$^7$ .............................. G06F 15/00; B41J 3/00
(52) U.S. Cl. .................... 358/1.14; 358/1.14; 358/1.16; 347/2
(58) Field of Search ................................ 358/296, 300, 358/1.15, 409, 1.14; 347/2; 700/203

(56) References Cited

U.S. PATENT DOCUMENTS

| | | | |
|---|---|---|---|
| 4,527,885 A | 7/1985 | Ayata et al. ................. | 355/3 R |
| 4,942,478 A | 7/1990 | Yamagishi et al. ......... | 358/409 |
| 5,680,221 A | 10/1997 | Takano ........................ | 358/296 |
| 5,812,747 A | 9/1998 | Kayano et al. ............. | 395/114 |
| 6,130,758 A | * 10/2000 | Funazaki .................... | 358/1.15 |
| 6,473,192 B1 | * 10/2002 | Kidani et al. ............... | 358/1.14 |

FOREIGN PATENT DOCUMENTS

| | | |
|---|---|---|
| EP | 0 478 355 A2 | 4/1992 |
| EP | 0 820 185 A2 | 1/1998 |

* cited by examiner

Primary Examiner—Kimberly Williams
Assistant Examiner—Saeid Ebrahimi
(74) Attorney, Agent, or Firm—Fitzpatrick, Cella, Harper & Scinto

(57) ABSTRACT

In a system that plural apparatuses mutually perform data communication, it enables to prevent decrease in productivity and to smoothly operate the entire system. In the system, when data received from an image data generation apparatus through a data communication medium is image data, acceptance from other image data generation apparatus is invalidated, and a printing process for the image data from the image data generation apparatus is performed. According as the data received from the image data generation apparatus through the data communication medium is first information output when an error occurs in the image data generation apparatus and representing this error, the invalidation of the acceptance from the other image data generation apparatus is released.

25 Claims, 10 Drawing Sheets

IMAGE FORMING SYSTEM, IMAGE FORMING APPARATUS, CONTROL METHOD THEREOF, IMAGE FORMING METHOD, AND STORAGE MEDIUM

BACKGROUND OF THE INVENTION

1. Field of the Invention

The present invention relates to an image forming apparatus capable of performing data communication with other apparatus, an image forming system, a control method thereof, an image forming method, and a storage medium.

2. Related Background Art

Recently, it has been proposed an image forming system in which plural image data generation apparatuses and plural image forming apparatuses remotely located mutually perform data communication through a transmission medium. Especially, the image forming system called a remote copying system in which the image data generation apparatus such as a scanner or the like and the image forming apparatus such as a printer or the like are connected by the transmission medium has been thought.

However, in this remote copying system, when the image data generation apparatus side starts the data communication to the image forming apparatus and then some error occurs on the image data generation apparatus side, there is a possibility for the image forming apparatus to be on standby until the error is released. Thus, when it enters once such a state, output jobs transmitted from other scanner, computer and the like can not be accepted, the standby state for execution of such the jobs continues, whereby it is anticipated that productivity of the entire system decreases.

SUMMARY OF THE INVENTION

An object of the present invention is to provide an image forming system which solves such a problem as described above, an image forming apparatus, a control method thereof, an image forming method, and a recording medium.

Another object of the present invention is to provide an image forming system in which plural apparatuses perform data communication mutually, decrease in productivity can be prevented, and a smooth operation can be achieved, an image forming apparatus, a control method thereof, an image forming method, and a recording medium.

Other objects and features of the present invention will become apparent from the following detailed description and the attached drawings.

DETAILED DESCRIPTION OF THE PREFERRED EMBODIMENTS

Hereinafter, the embodiments of the present invention will be explained with reference to the attached drawings.

Figure 1:
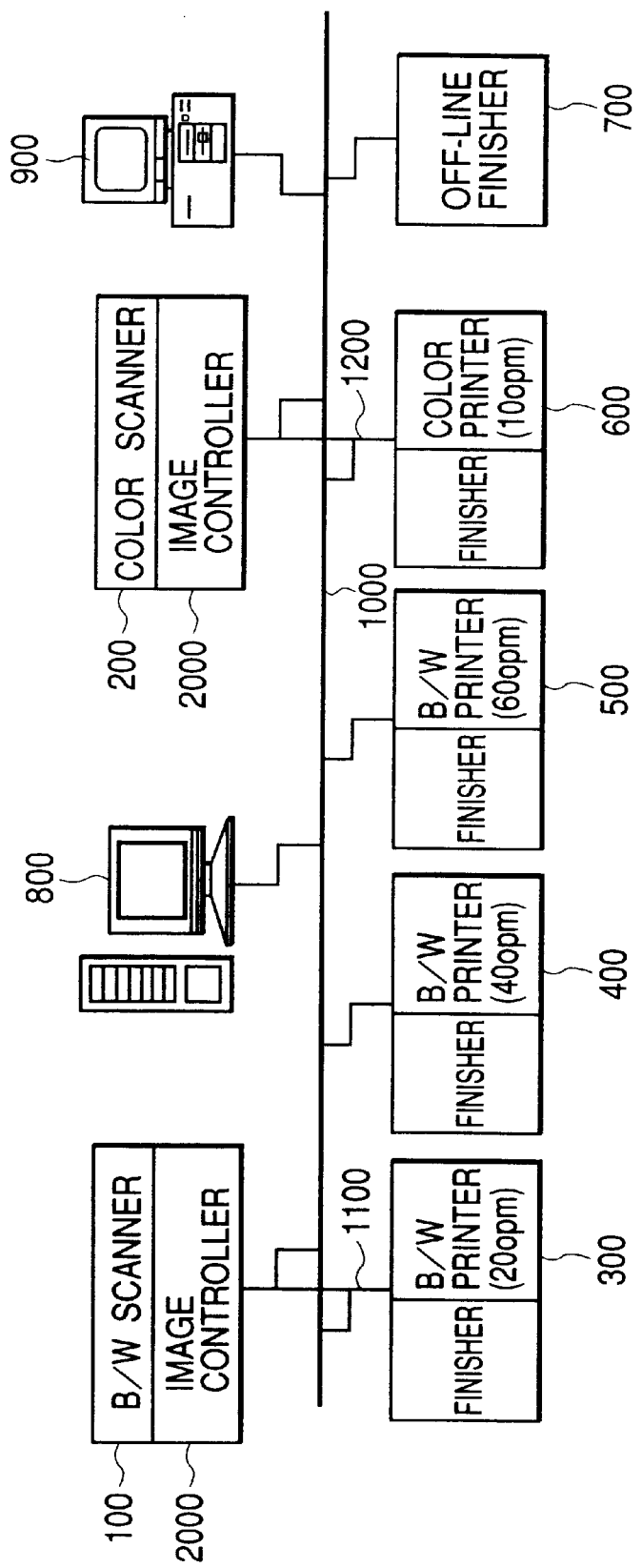
FIG. 1 is a block diagram showing an entire structure of an image forming system to which the present invention is applicable.

FIG. 1 shows an entire structure of an image forming system according to the present invention.

The image forming system includes a black and white (B/W) scanner 100 which acts as an image data generation apparatus and can read a black and white (B/W) original, a color scanner 200 which can read a color original, a server computer 800 which has a large-capacity storage, and a personal computer (PC) 900 which is used by an individual user and also has a large-capacity storage. Further, the image forming system includes, as image forming apparatuses, a low-speed (20 opm (operations per minute)) B/W printer 300, an intermediate-speed (40 opm) B/W printer 400, a high-speed (60 opm) B/W printer 500 capable of performing two-faced copying, and a color printer 600. Further, the image forming system includes an off-line finisher 700 which can performs off-line a postprocess to printed sheets. These apparatuses can mutually perform data communication through a data communication medium such as an Ethernet 1000 or the like. It should be noted that, although it is not shown in FIG. 1, the apparatuses in this system can perform data communication with other apparatus (e.g., a fax machine or the like) through a data communication medium (e.g., a telephone line).

In the embodiment, such components as above which are mutually connected by the Ethernet 1000 acting as the transmission means in the network structure constitute a LAN (local area network). Hereafter, the Ethernet 1000 is described also as the LAN 1000. Further, the B/W scanner 100 and the low-speed B/W printer 300 are connected to each other through a B/W-dedicated video bus 1100, and the color scanner 200 and the color printer 600 are connected to each other through a color-dedicated video bus 1200.

It is assumed that the basic structures of the scanners 100 and 200 are the same. Further, an image controller 2000 for performing image reading control and image transfer control is connected to each of the scanners 100 and 200 through a dedicated bus (not shown).

It is assumed that the basic structures of the image forming apparatuses 300, 400, 500 and 600 are the same, and an on-line finisher capable of performing on-line a postprocess (i.e., a sort process, a stapling process, or the like) to printed sheets is connected to each of these apparatuses. However, the detailed explanation of this finisher will be omitted.

Hereinafter, the details of the image controller 2000, the B/W scanner 100 and the intermediate-speed B/W printer 400 will be explained by way of example. It should be noted that the B/W scanner 100 and the B/W printer 400 can be used as a single-unit apparatus such as a multifunctional peripheral (MFP) on which various functions (a copying function, a fax function, a printer function, a scanner function, etc.) are installed, or can be used separately. The embodiment of the present invention is applicable to either case.

(Image Controller)

Figure 2:
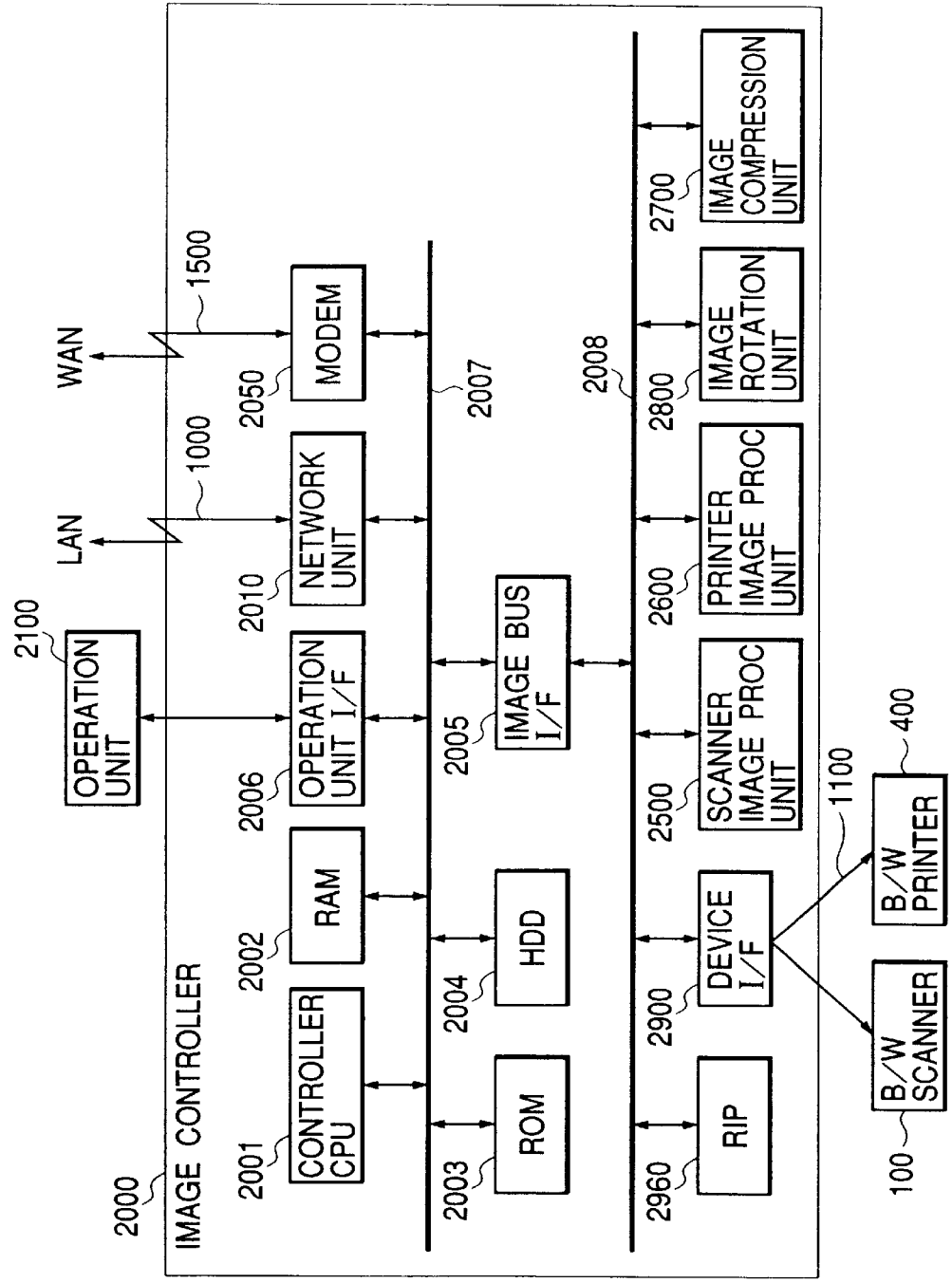
FIG. 2 is a block diagram showing an image controller in the image forming system to which the present invention is applicable.

FIG. 2 is a block diagram showing the structure of the image controller 2000.

The image controller 2000 is connected to the B/W scanner 100 acting as the image data generation apparatus and the B/W printer 400 acting as the image forming apparatus, and equally connected to the LAN 1000 and a public line or a wide area network (WAN) 1500, whereby input and output of image information and device information are controlled. The image controller 2000 can be connected to other data generation apparatus and image forming apparatus through the LAN 1000 or the WAN 1500.

In the image controller 2000, a controller CPU 2001 controls the controller 2000 as a whole, and a RAM 2002 which temporarily stores image data acts as a system working memory used when the controller CPU 2001 operates. A ROM 2003 which is a boot ROM stores a system boot program, and a hard disk drive (HDD) 2004 stores system software and various image data. Concretely, information which concerns image output speed, setting positions and the like of nodes connected on the network (LAN 1000) has been stored for each address in the HDD 2004.

An operation unit interface (I/F) 2006 which interfaces with an operation unit (a user interface (UI)) 2100 outputs image data to be displayed to the operation unit 2100. Further, the operation unit I/F 2006 functions to transfer to the controller CPU 2001 the information (e.g., execution instructions for user's desired modes such as a network scan mode, a local copying mode, a remote copying mode, etc. and information of an operation mode and the like) which is input from the operation unit 2100 by a user of this system. A network unit 2010 which is connected to the LAN 1000 inputs and outputs various information, and also a modem 2050 which is connected to the WAN 1500 inputs and outputs various information.

Such devices as above are disposed on a system bus 2007. An image bus interface (I/F) 2005 which is a bus bridge connects the system bus 2007 to an image bus 2008 which transfers image data at high speed, whereby the data structure is converted.

The image bus 2008 is the high-speed bus such as a 32-bit width PCI (peripheral component interconnect) bus or the like. On the image bus 2008, a raster image processor (RIP) 2960, a device interface (I/F) 2900, a scanner image processing unit 2500, a printer image processing unit 2600, an image rotation unit 2800, and an image compression unit 2700 are disposed. The RIP 2960 expands a PDL (page description language) code to a bit map image. The device I/F 2900 connects the B/W scanner 100 (image input apparatus) and the B/W printer 400 (image output apparatus) to the image controller 2000, and performs synchronous and asynchronous conversion to image data as described later.

The scanner image processing unit 2500 corrects, processes and edits input image data as described later. The printer image processing unit 2600 performs printer correction, resolution conversion and the like to print output image data. The image rotation unit 2800 performs rotation of image data as described later. The image compression unit 2700 performs compression and decompression processes of JPEG (joint photographic experts group) method to multi-value image data, and performs compression and decompression processes of JBIG (joint bi-level image experts group) method, MMR (modified modified READ coding) method and MH (modified Huffman coding) method to binary image data, as described later.

(Image Input Apparatus (Scanner))

Figure 3:
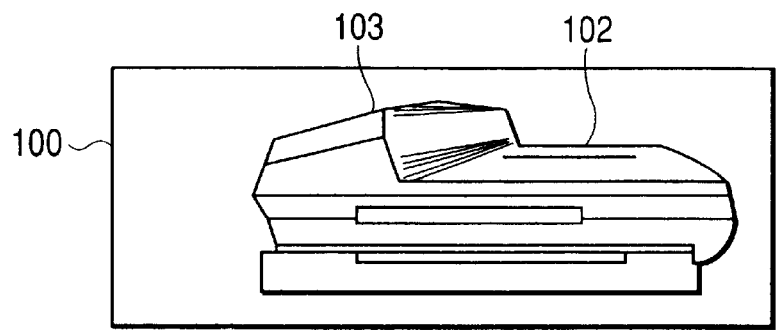
FIG. 3 is a diagram showing an appearance of an image input apparatus in the image forming system to which the present invention is applicable.

FIG. 3 is a block diagram showing the structure of the image input apparatus.

The B/W scanner 100 which acts as the image input apparatus illuminates an image on a sheet being an original, relatively moves a CCD line sensor (not shown) to the original to scan it, and then converts the scanned and read image into an electrical signal as raster image data. When the original is set to an original stacking device 103 of an automatic document feeder (ADF) 102 and an instruction to start the reading is input by the user from the operation unit 2100, the controller CPU 2001 instructs the B/W scanner 100 to cause the ADF 102 to feed the original one by one for the original image reading.

(Image Output Apparatus (Printer))

Figure 4:
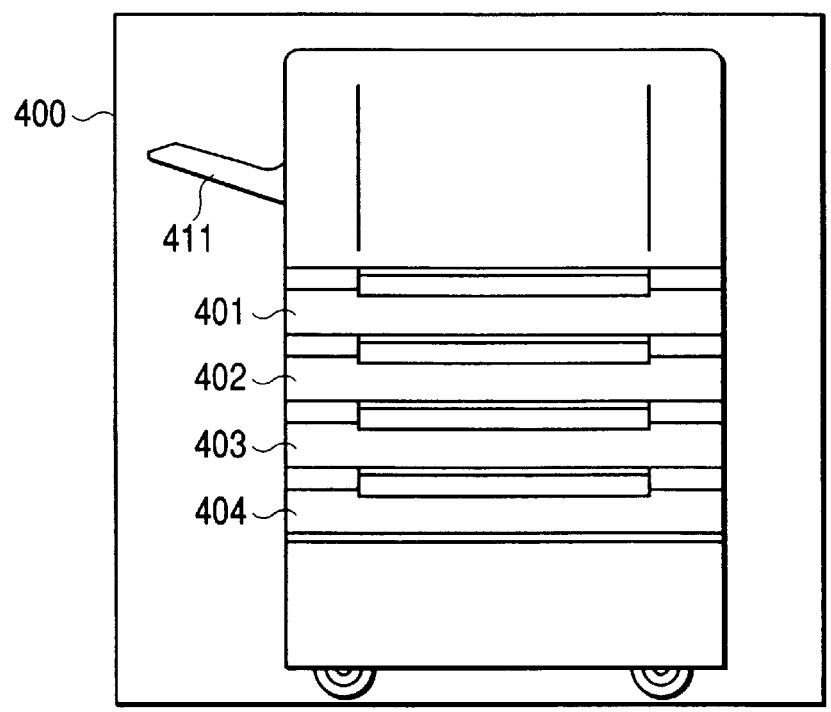
FIG. 4 is a diagram showing an appearance of an image output apparatus in the image forming system to which the present invention is applicable.

FIG. 4 is a block diagram showing the structure of the image output apparatus.

The B/W printer 400 which acts as the image output apparatus converts the electrical signal being the raster image data into an image and then records the obtained image on a sheet. As a printing method, it is possible to apply any of an electrophotographic method which uses a photosensitive drum or a photosensitive belt, an inkjet method which emits ink from a micronozzle array to directly print an image on a sheet, and the like.

The printing operation is started based on an instruction from the controller CPU 2001. The B/W printer 400 provides plural stages to be able to select different sheet sizes and directions, and sheet cassettes 401, 402, 403 and 404 corresponding to the respective stages are provided. The sheet subjected to the printing is discharged on a sheet discharge tray 411.

(Scanner Image Processing Unit)

Figure 5:
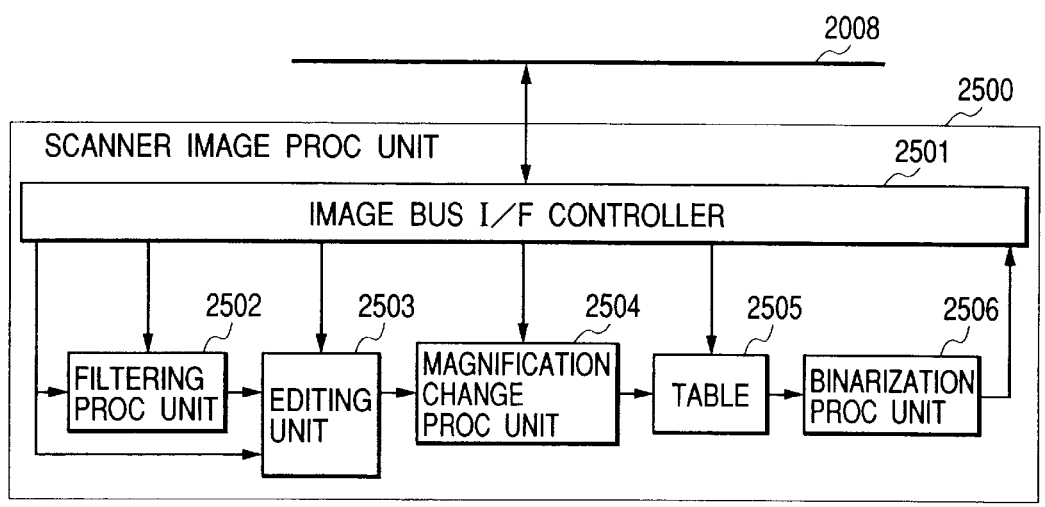
FIG. 5 is a block diagram showing an image processing unit of the image input apparatus (a scanner) in the image forming system to which the present invention is applicable.

FIG. 5 is a block diagram showing the structure of the scanner image processing unit 2500.

An image bus interface (I/F) controller 2501 which is connected to the image bus 2008 has a function to control its bus access sequence, control each device in the scanner image processing unit 2500, and generate timing of each device. A filtering processing unit has a function to perform a convolution operation by using a spatial filter.

An editing unit 2503 recognizes a closed area surrounded by a marker pen in input image data, and performs an image process such as shadow, shading, highlight or the like to the image data in the closed area. When a resolution of a read image is changed, a magnification change processing unit 2504 performs an interpolation operation to the main scan direction of a raster image and performs size enlargement and reduction. The magnification in the sub scan direction is changed by changing movement speed of an image read line sensor (not shown).

A table 2505 is used to table conversion for converting read image data (luminance data) into density data. A binarization processing unit 2505 binarizes multivalue gray scale image data in an error diffusion process and a screening process.

The image data which was processed by the scanner image processing unit 2500 is again transferred to the image bus 2008 through the image bus I/F controller 2501.

(Printer Image Processing Unit)

Figure 6:
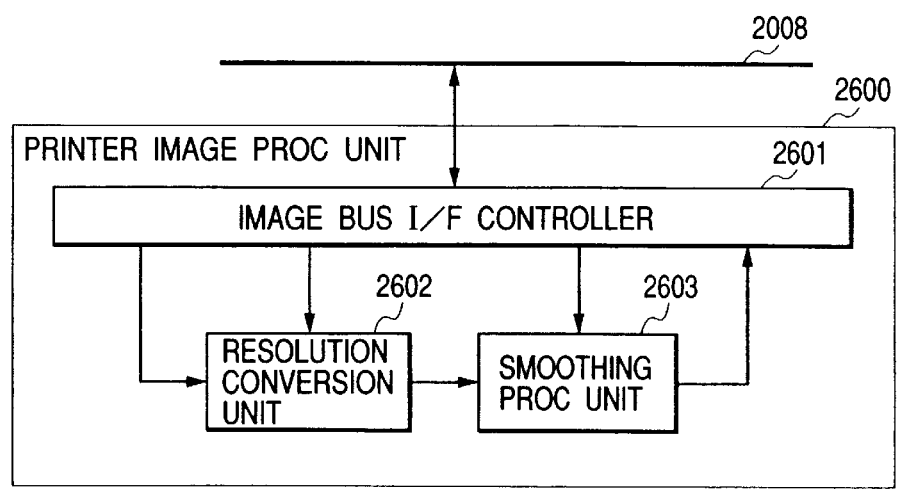
FIG. 6 is a block diagram showing an image processing unit of the image output apparatus (a printer) in the image forming system to which the present invention is applicable.

FIG. 6 is a block diagram showing the structure of the printer image processing unit 2600.

An image bus interface (I/F) controller 2601 which is connected to the image bus 2008 has a function to control its bus access sequence, control each device in the printer image processing unit 2600, and generate timing of each device. A resolution conversion unit 2602 has a function to perform resolution conversion to image data sent from the network unit 2010 or the WAN 1500 to obtain the resolution of the B/W printer 400. A smoothing processing unit 2603 performs a process to smooth a jaggy of the image data (image roughness appearing at, e.g., an oblique B/W boundary) after the resolution conversion.

(Image Compression Unit)

Figure 7:
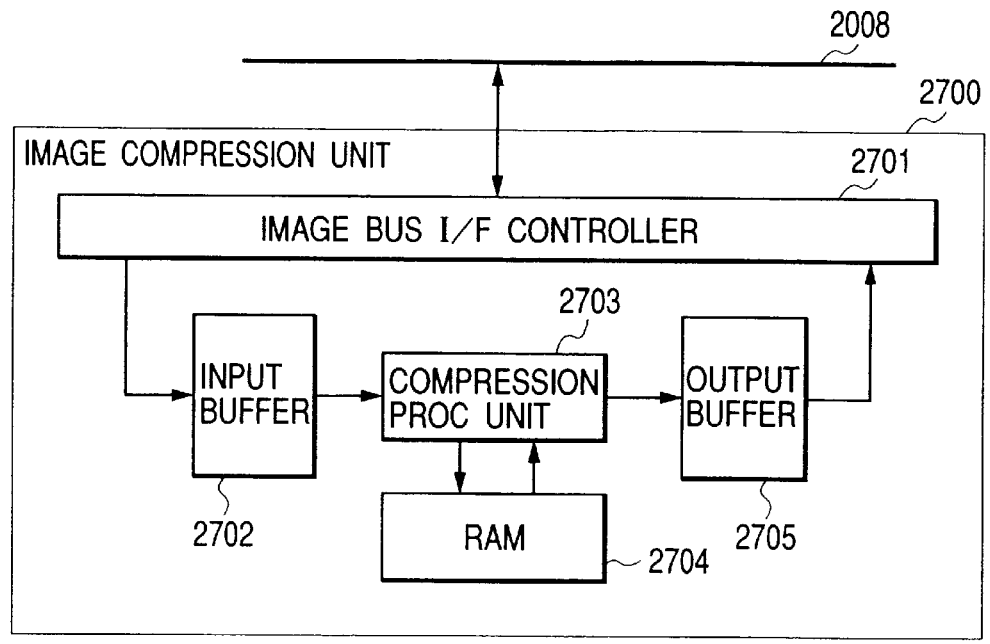
FIG. 7 is a block diagram showing an image compression unit in the image forming system to which the present invention is applicable.

FIG. 7 is a block diagram showing the structure of the image compression unit 2700.

An image bus interface (I/F) controller 2701 which is connected to the image bus 2008 has a function to control its bus access sequence, control timing to exchange data between an input buffer 2702 and an output buffer 2705, and control mode setting to a compression processing unit 2703.

Hereinafter, a processing procedure of the image compression unit 2700 will be explained.

The controller CPU 2001 performs setting for image compression control to the image bus I/F controller 2701, through the image bus 2008. By this setting, the image bus I/F controller 2701 performs setting of, e.g., MMR compression, JBIG decompression and the like necessary for the image compression to the compression processing unit 2703. After then, the controller CPU 2001 again permits the image bus I/F controller 2701 to transfer the image data.

In accordance with such transfer permission, the image bus I/F controller 2701 starts the image data transfer from the RAM 2002 or each device on the image bus 2008. The received image data is temporarily stored in the input buffer 2702 and then transferred at certain speed according to an image data request of the compression processing unit 2703. At this time, it is judged at the input buffer 2702 whether or not the image data can be transferred between the image bus I/F controller 2701 and the compression processing unit 2703. Then, if judged that the image data reading from the image bus 2008 and the image writing to the compression processing unit 2703 can not be performed, it is controlled not to perform the data transfer (hereinafter, such control is called "handshaking").

The compression processing unit 2703 once stores the received image data in a RAM 2704. This is because data of plural lines are necessary according to a kind of image compression process, and the image compression for initial one line can not be performed if the image data of the plural lines are not prepared.

The image data subjected to the image compression is immediately transferred to the output buffer 2705. In the output buffer 2705, the handshaking between the image bus I/F controller 2701 and the compression processing unit 2703 is performed, and the image data is then transferred to the image bus I/F controller 2701. In the image bus I/F controller 2701, the compressed (or decompressed) image data transferred is further transferred to the RAM 2002 or each device on the image bus 2008.

Such a series of the processes in the image compression unit 2700 is repeated until a processing request from the controller CPU 2001 ends (i.e., the processes of necessary pages end) or a stop request is issued from the compression processing unit 2703 (i.e., an error in the compression or decompression occurs).

(Image Rotation Unit)

Figure 8:
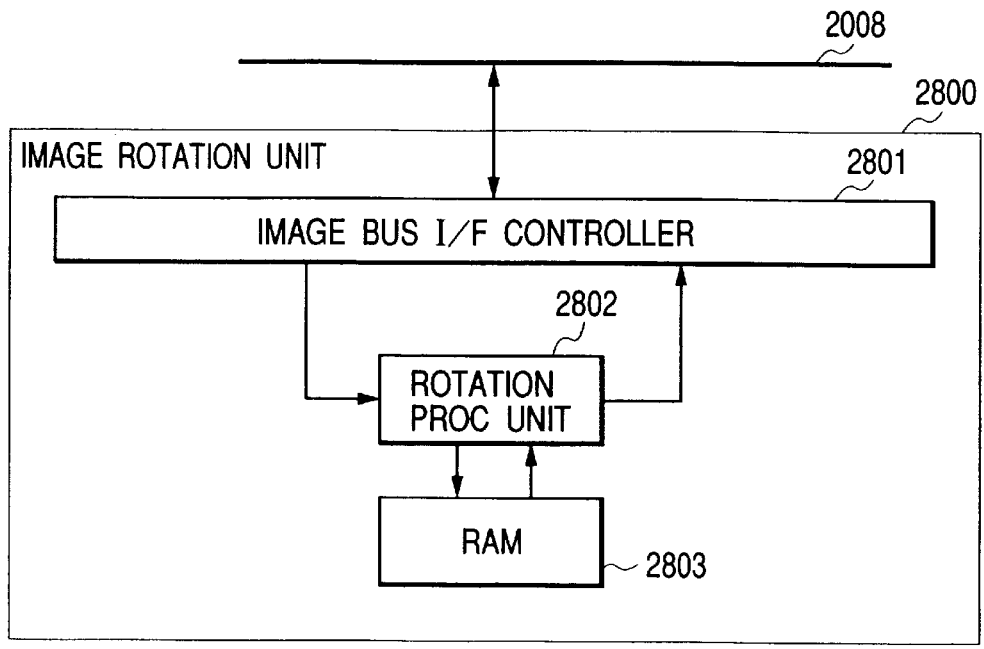
FIG. 8 is a block diagram showing an image rotation unit in the image forming system to which the present invention is applicable.

FIG. 8 is a block diagram showing the structure of the image rotation unit 2800.

An image bus interface (I/F) controller 2801 which is connected to the image bus 2008 has a function to control its bus access sequence, control mode setting or the like to a rotation processing unit 2802, and control timing to transfer image data to the rotation processing unit 2802.

Hereinafter, a processing procedure of the rotation processing unit 2802 will be explained.

The setting to control the image rotation is performed by the controller CPU 2001 to the image bus I/F controller 2801 through the image bus 2008. By this setting, the image bus I/F controller 2801 performs the setting of, e.g., an image size, a rotation direction, an angle and the like necessary for the image rotation to the rotation processing unit 2802. After then, the controller CPU 2001 again permits the image bus I/F controller 2801 to transfer the image data.

In accordance with such transfer permission, the image bus I/F controller 2801 starts the image data transfer from the RAM 2002 or each device on the image bus 2008. Here, it is assumed that the size of the data to be transferred is 32 bits, the image size for the rotation is 32×32 (bits), the image data is transferred on the image bus 2008 in the unit of 32 bits, and the image to be managed here is represented by binary data.

Figure 9:
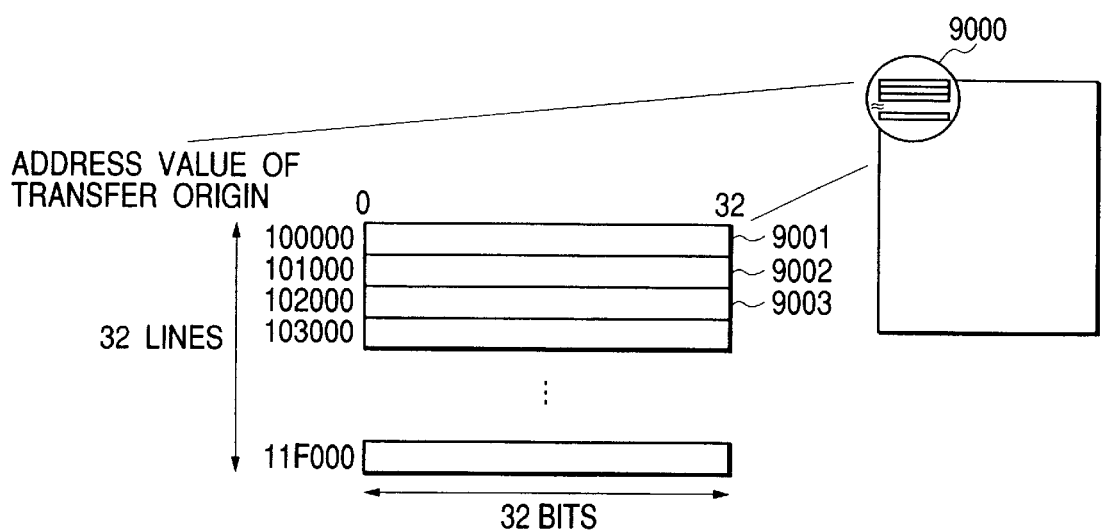
FIG. 9 is a diagram (part one) for explaining image rotation by the image rotation unit in the image forming system to which the present invention is applicable.

As above, in order to obtain the image of 32×32 (bits), it is necessary to perform the unitary data transfer 32 times, and transfer the image data from discontinuous addresses. For example, as shown in FIG. 9, it is thought that a part 9000 represents the image data of the unit of 32×32 (bits). In this unit image data 9000, addresses of the first line are "100000" to "100031", and addresses of the second line are "101000" to "101031". As for other lines, it is similar. Namely, the addresses of the unit image data 9000 are discontinuous for each line.

Figure 10:
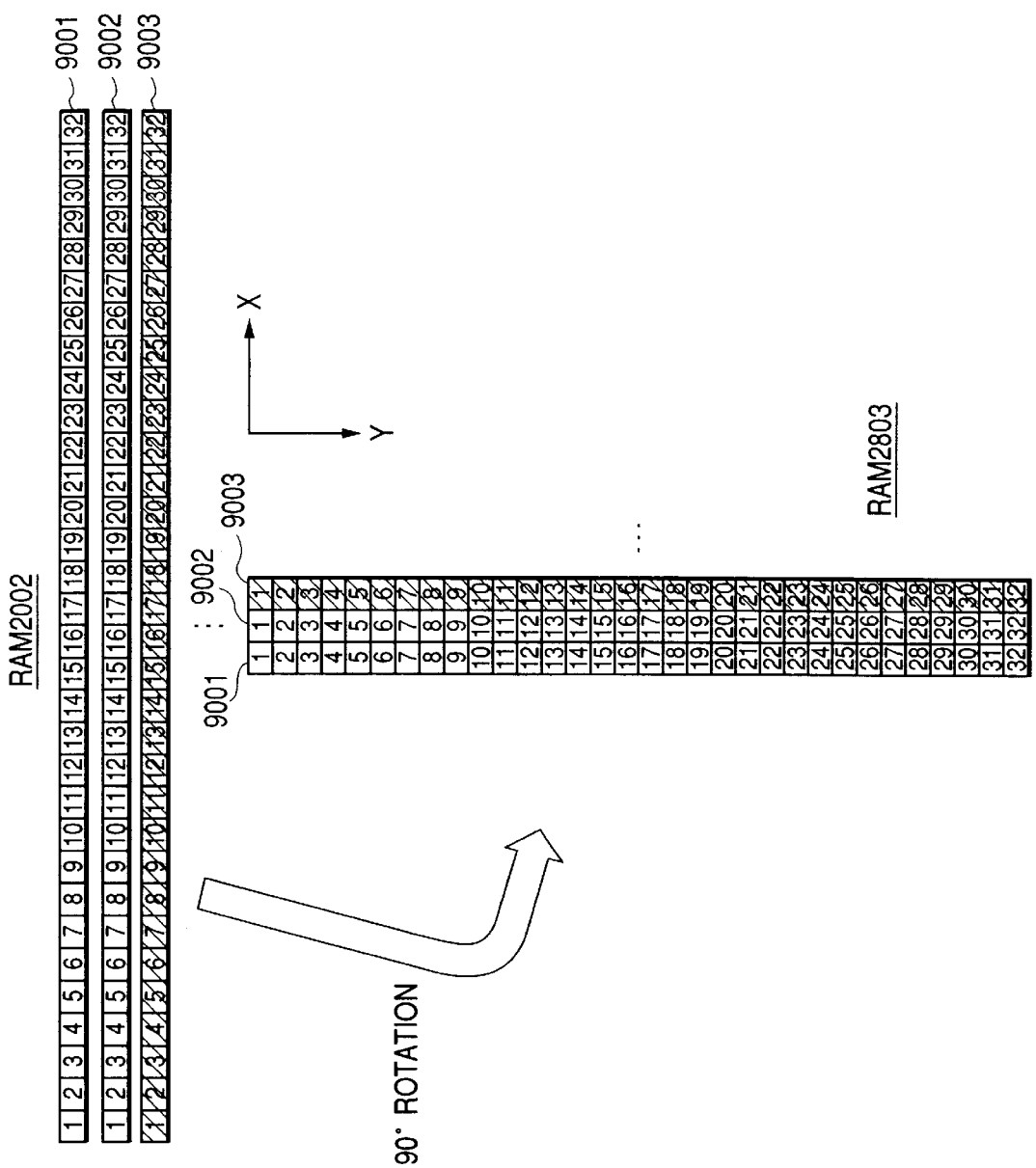
FIG. 10 is a diagram (part two) for explaining image rotation by the image rotation unit in the image forming system to which the present invention is applicable.

The image data 9000 which was transferred by the discontinuous addressing is written at certain addresses on a RAM 2803 such that the image is rotated by a desired angle when the image data is read. For example, when the image is rotated counterclockwise by 90°, 32-bit image data 9001 first transferred is written in the Y direction as shown in FIG. 10. Then, image data 9002 and 9003 are sequentially written in the Y direction in the read order, whereby the image data 9000 is rotated counterclockwise by 90°.

After the rotation (i.e., the writing in the RAM 2803) of the unit image data 9000 of 32×32 (bits) ends, the rotation processing unit 2802 reads the image data from the RAM 2803 in the above-described reading manner and transfers the read image data to the image bus I/F controller 2801.

The image bus I/F controller 2801 which received the rotation-processed image data 9000 transfers the data to the RAM 2002 or each device on the image bus 2008 by continuous addressing.

Such a series of the processes in the image rotation unit 2800 is repeated for each unit image data until a processing request from the controller CPU 2001 ends (i.e., the processes of necessary pages end).

(Device I/F Unit)

Figure 11:
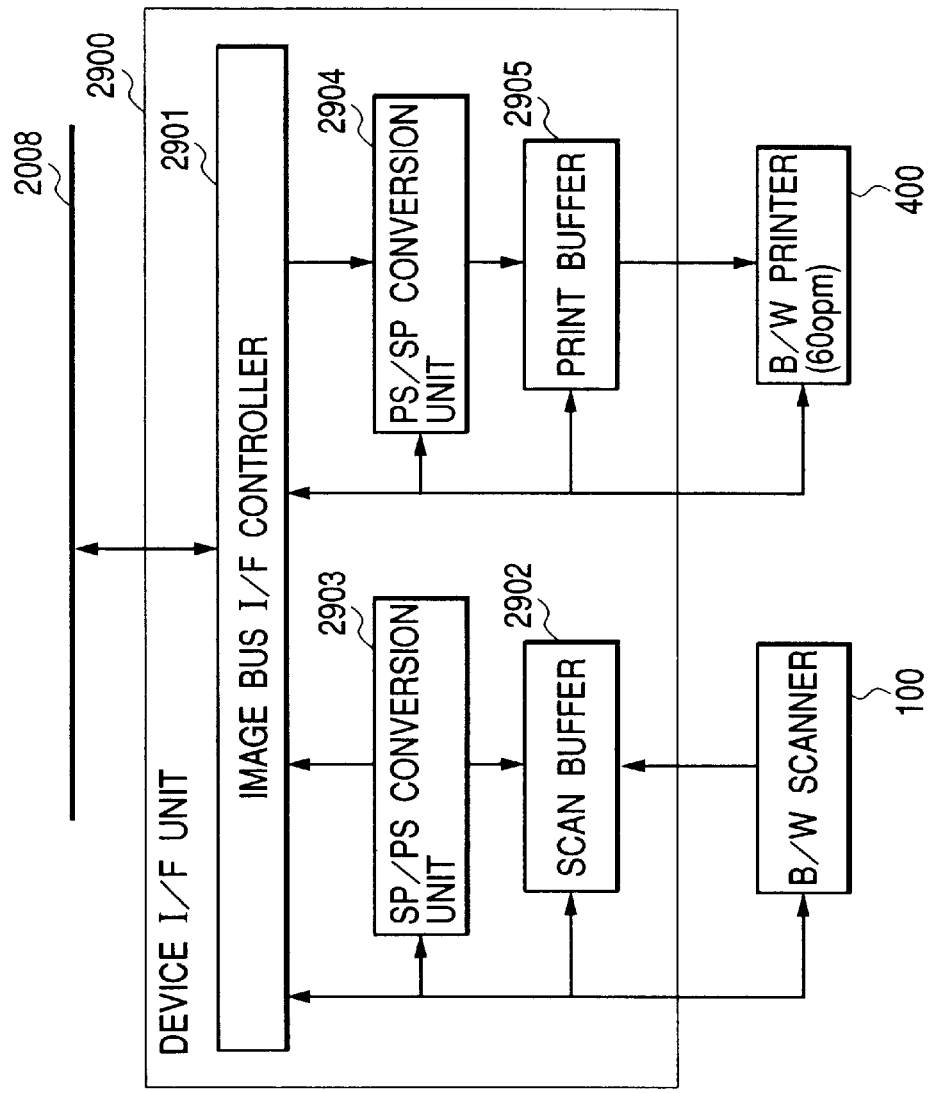
FIG. 11 is a block diagram showing a device interface (I/F) unit in the image forming system to which the present invention is applicable.

FIG. 11 is a block diagram showing the structure of the device I/F unit 2900.

An image bus interface (I/F) controller 2901 which is connected to the image bus 2008 has a function to control its bus access sequence, control each device in the device I/F unit 2900, and generate timing of each device. Further, the image bus I/F controller 2901 generates a control signal to the external B/W scanner 100 and B/W printer 400. A scan buffer 2902 temporarily stores the image data transferred from the B/W scanner 100, and outputs image data in synchronism with the image bus 2008.

A serial-to-parallel/parallel-to-serial (SP/PS) conversion unit 2903 ranges in due order or decomposes the image data temporarily stored in the scan buffer 2902 to convert its data width into the data width capable of being transferred to the image bus 2008. A parallel-to-serial/serial-to-parallel (PS/SP) conversion unit 2904 decomposes or ranges in due order the image data transferred from the image bus 2008 to convert its data width into the data width capable of being stored in a print buffer 2905.

The print buffer 2905 temporarily stores the image data transferred from the image bus 2008, and outputs the image data in synchronism with the B/W printer 400.

Hereinafter, a processing procedure at the image scan will be explained.

The image data transferred from the B/W scanner 100 is temporarily stored in the scan buffer 2902 in synchronism with a timing signal from the B/W scanner 100. Then, in the case where the image bus 2008 is the PCI bus, when the image data equal to or more than 32 bits is stored in the scan buffer 2902, the image data of 32 bits is read from the scan buffer 2902 and transferred to the SP/PS conversion unit 2903 in FIFO (first-in first-out) manner. Then, the image data is converted into the 32-bit image data and transferred to the image bus 2008 through the image bus I/F controller 2901.

In a case where the image bus 2008 is an IEEE1394 (Institute of Electrical and Electronics Engineers standard 1394) bus, the image data in the scan buffer 2902 is read and transferred to the SP/PS conversion unit 2903 in the FIFO manner. Then, the transferred image data is converted into serial image data and further transferred to the image bus 2008 through the image bus I/F controller 2901.

Hereinafter, a processing procedure at the image printing will be explained.

In the case where the image bus 2008 is the PCI bus, the image data of 32 bits transferred from the image bus 2008 is received by the image bus I/F controller 2901, transferred to the PS/SP conversion unit 2904, decomposed into the image data of input data bit number of the B/W printer 400, and temporarily stored in the print buffer 2905.

In the case where the image bus 2008 is the IEEE1394 bus, the serial image data transferred from the image bus 2008 is received by the image bus I/F controller 2901, transferred to the PS/SP conversion unit 2904, decomposed into the image data of input data bit number of the B/W printer 400, and temporarily stored in the print buffer 2905. Then, in synchronism with a timing signal from the B/W printer 400, the image data in the print buffer 2905 is transferred to the B/W printer 400 in FIFO manner.

[One Preferred Embodiment of Present Invention]

Next, one preferred embodiment concerning the image forming system, method and storage medium according to the present embodiment will be concretely explained with reference to FIGS. 12 and 13.

A process for once stopping the operation of the image forming apparatus and enabling to accept other job when an error occurs in the image data generation apparatus will be explained with reference to the flow charts shown in FIGS. 12 and 13. The control shown in FIG. 12 is directed to the process on the image input apparatus side being the image data generation apparatus, and the control shown in FIG. 13 is directed to the process on the image forming apparatus side.

In the present embodiment, it is assumed that the image data of the original read by the ADF of the B/W scanner 100 is transmitted to other remote-located apparatus such as the B/W printer 500 through the Ethernet 1000, and that the user setting concerning remote copying from the scanner to the printer (e.g., setting of data transmission destination selection, setting of operation mode, etc.) is performed at the operation unit 2100 of the B/W scanner 100 to cause the B/W printer 500 to print the transmitted image data. Further, for example, when the MFP integrally containing the B/W scanner 100 and the B/W printer 400 is used, programs representing the flow charts of FIGS. 12 and 13 have been stored in the memory of the image controller 2000 in this MFP. Thus, either one of these programs according to a user's instruction is read and executed by the CPU 2001.

Further, in the present embodiment, it is possible to select a mode (called a clustering mode) in which the image data output from one image data generation apparatus is printed by the plural image forming apparatuses. For example, when an original of 100 pages is read by the B/W scanner 100, the read image data of the first to 50th pages can be printed by the B/W printer 300, and the read image data of the 51st to 100th pages can be printed by the B/W printer 400. Further, for example, when 100 copies of an original of ten pages read by the B/W scanner 100 are output, the 50 copies can be printed by the B/W printer 300, and the remaining 50 copies can be printed by the B/W printer 400.

In any case, when such the clustering mode is executed, an output destination candidate is designated on the operation unit 2001 by the operator. Further, it is set which image forming apparatus should print how many pages (from what page to what page) of the original, or which image forming apparatus should print how many copies of the original. The image controller 2000 transmits the necessary information together with the image data to each image forming apparatus, in accordance with the user's instruction.

On the operation unit 2100 shown in FIG. 2, a start key (not shown) is provided to start the image reading.

Here, the error detection of the image input apparatus on the image input apparatus side will be explained with reference to FIG. 12.

It is judged in a step S1 whether or not there is a key input. If judged that there is the key input, then the flow advances to a step S2 to judged whether or not the start key is depressed. If judged that the start key is not depressed, the flow returns to the step S1 to wait for the key input. Conversely, if judged that the start key is depressed, then the flow advances to a step S3. In the step S3, when an image feed apparatus such as the ADF or the like is provided, the original is fed. It should be noted that, in the present embodiment, a head page processing mode to sequentially feed and read the originals of one sheaf from its head page in due order is executed. Next, in a step S4, it is judged based on a sheet detection result from a not-shown sensor inside the ADF whether or not a feeder jam occurs.

If judged in the step S4 that the feeder jam occurs, then error information representing that the feeder jam occurs is set as the data to be transmitted to the apparatus to which the image data should be transmitted, and this error information is actually transmitted to such the apparatus at the data transmission destination (the B/W printer 500 in this example) through the Ethernet 1000 (step S10). In the case where the above clustering mode has been selected on the operation unit 2001, the error information is transmitted through the Ethernet 1000 to each of the plural image forming apparatuses selected based on the operator's setting on the operation unit 2001.

Then, the flow waits for the release of error (e.g., elimination of the jammed original by the operator, resetting of the original on the ADF, or the like) (step S12). When the error is released, the flow returns to the step S3 to restart the job.

On the other hand, if judged in the step S4 that the feeder jam does not occur, then a flow advances to a step S5 to judge whether or not sheet feed ends. Then, if judged in the step S5 that the sheet feed does not end, the flow returns to the step S4. Conversely, if judged in the step S5 that the sheet feed ends, the flow advances to a step S6 to perform the original reading process. After the original is read in the step S6, it is then judged in a step S7 whether or not the memory provided in the image input apparatus and capable of storing the image data is full of the stored data.

If judged in the step S7 that the memory is full of the data, then error information representing that the memory full occurs is set as the data to be transmitted to the apparatus to which the image data should be transmitted, and this error information is actually transmitted to such the apparatus at the data transmission destination (the B/W printer 500 in this example) through the Ethernet 1000 (step S11). In the case where the above clustering mode has been selected on the operation unit 2001, the error information is transmitted through the Ethernet 1000 to each of the plural image forming apparatuses selected based on the operator's setting on the operation unit 2001.

Then, the flow waits for the release of error (step S12). When the error is released, the flow returns to the step S3 to restart the job.

On the other hand, if judged in the step S7 that the memory full does not occur, then a flow advances to a step S8. In the step S8, the image data which was read in the step S6 is transmitted, as the data to be transmitted to the partner, to the data forming apparatus (the B/W printer 500 in this example) being the data transmission object through the Ethernet 1000 together with a job start instruction, the data indicating the operation mode and the like. Next, in a step S9, it is judged whether or not the fed original is the final original. If judged that the fed original is not the final original, the flow returns to the step S3 to continue the original feed.

On the other hand, if judged in the step S9 that the fed original is the final original, end notification information representing that the image data to be transmitted has been transmitted completely is set as the information to be notified to the partner, and this information is actually transmitted to the apparatus at the data transmission destination (the B/W printer 500 in this example) through the Ethernet 1000. Then, the flow returns to the step S1 to wait for a next key input.

As apparent from a series of the processes from the step S3 to again the step S3 through the steps S6, S8 and S9, in the present embodiment, it is controlled to transmit the image data to the image forming apparatus side every time the original of the predetermined unit (e.g., one page) is read from the sheaf of the originals including the plural pages. Thus, it is possible to reduce the load of the image input apparatus and achieve a real-time process.

Next, the process on the image output apparatus side (the B/W printer 500 in this example) will be explained with reference to FIG. 13. In the case where the above clustering mode has been selected on the operation unit 2001 at the image data generation apparatus side, the following process of FIG. 13 is performed independently for each of the plural image forming apparatuses selected based on the operator's setting from the operation unit 2001.

First, in a step S20, it is judged whether or not there is data acceptance (i.e., remote acceptance) from the external apparatus such as the image input apparatus (the B/W scanner 100 in this example) or the like, on the basis of judgment whether or not the data or the like is received from the external apparatus through the Ethernet 1000. If judged in the step S20 that there is the data acceptance, the flow advances to a step S21 to check the content of the received data. Thus, it is judged whether or not the data or the like received from the external apparatus represents an image (e.g., whether the image information or the error information).

If judged in the step S21 that the data received from the external apparatus represents the image, the flow advances to a step S26 to disable other job acceptance.

Concretely, for example, on the basis of the judged result in the step S20, the image data generation apparatus (the B/W scanner 100 in this example) on the output request origin being the remote acceptance object is set to be able to occupy the B/W printer 500. Further, the job acceptance from the image data generation apparatus other than the above image data generation apparatus (the B/W scanner 100) is invalidated (i.e., the image from such the apparatus is set not to be printed). Here, the image data generation apparatus such as the color scanner 200, the server computer 800, the PC 900 or the like corresponds to the image data generation apparatus other than the above image data generation apparatus (the B/W scanner 100). When a fax mode is provided, a fax machine not shown in FIG. 1 capable of communicating with the image forming apparatus is included in such the image data generation apparatus other than the above image data generation apparatus.

Subsequent to the step S26, the image is received (step S27). Then, the image data transferred from the image data generation apparatus on the output request origin is printed on a sheet based on operation mode data also received in correspondence with this image data (step S28).

Figure 12:
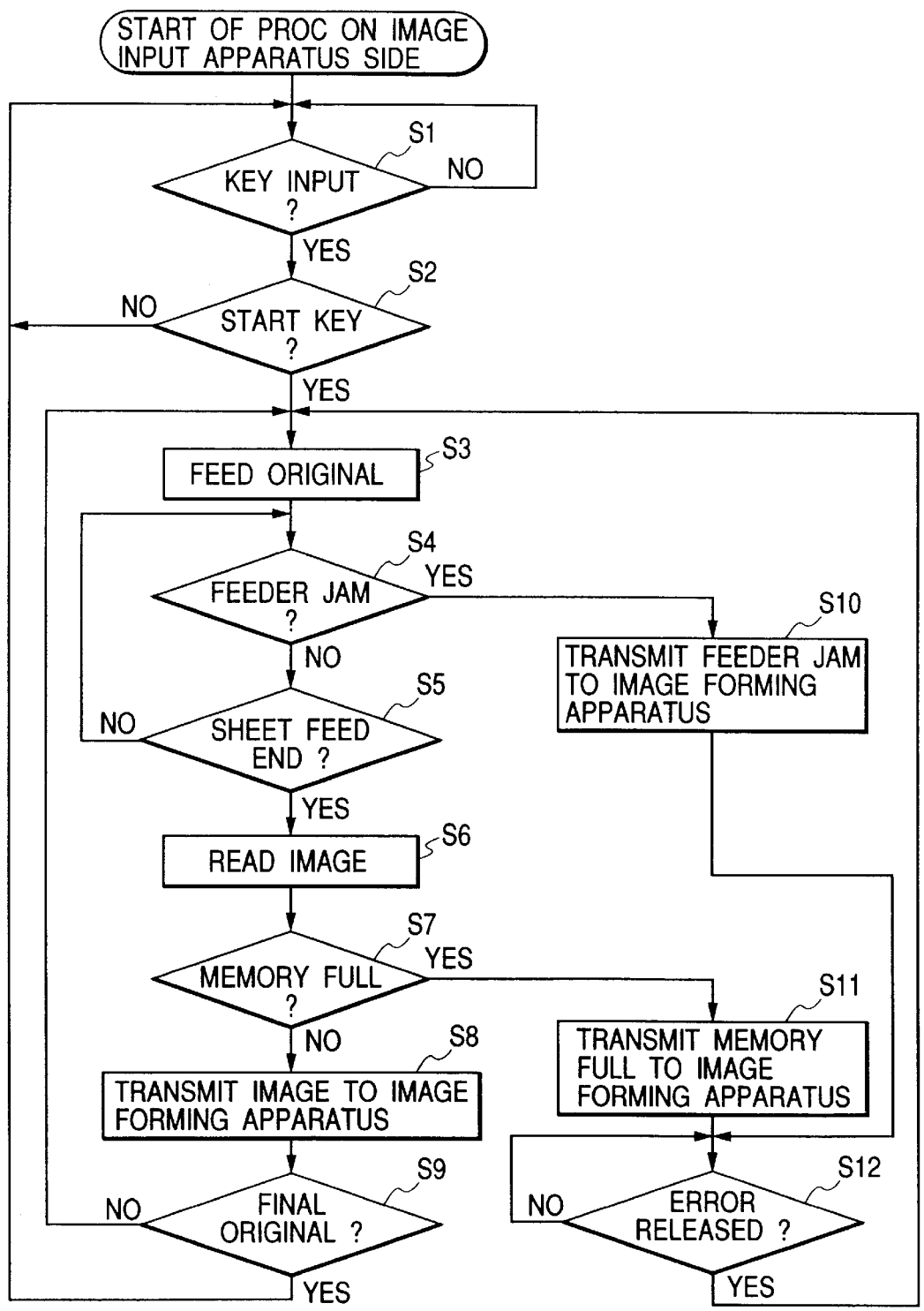
FIG. 12 is a flow chart showing an example of output control according to the present invention.
Figure 13:
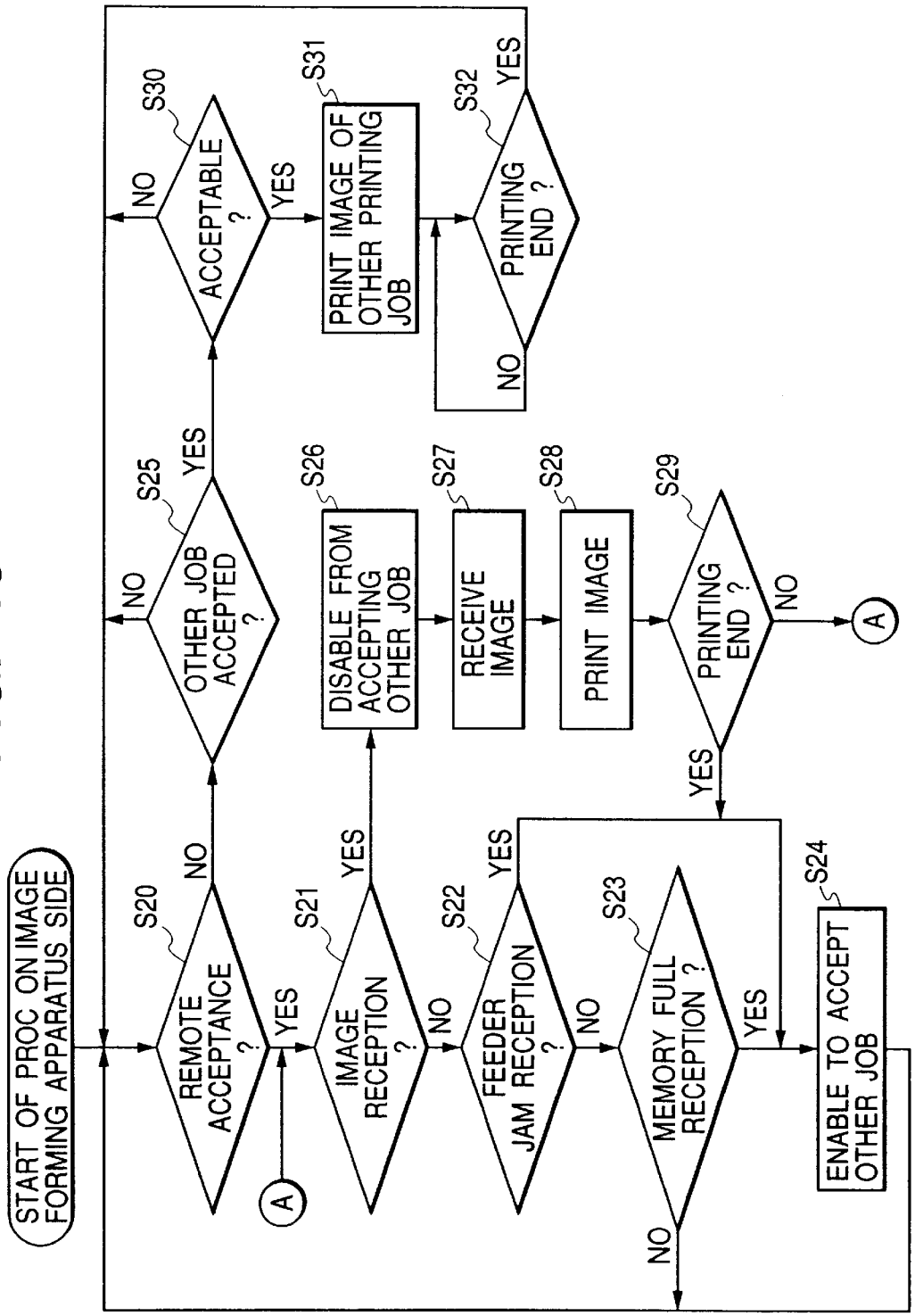
FIG. 13 is a flow chart showing an example of output control according to the present invention.

Then, the flow advances to a step S29 to judge whether or not the image data to be output is printed completely, on the basis of the judgment whether or not an end notification output in the step S9 of FIG. 12 is received (step S29).

If judged in the step S29 that the image data to be output is not printed completely, the flow returns to the step S21.

Conversely, if judged in the step S29 that the image data to be output is printed completely, it enables other job acceptance. For example, the invalidation of the job acceptance from the image data generation apparatus other than the above image data generation apparatus (the B/W scanner 100) is released to enable the printing. Here, the image data generation apparatus such as the color scanner 200, the server computer 800, the PC 900 or the like corresponds to this image data generation apparatus other than the above image data generation apparatus (the B/W scanner 100). When the fax mode is provided, a fax machine not shown in FIG. 1 capable of communicating with the image forming apparatus is included in this image data generation apparatus other than the above image data generation apparatus.

On the other hand, if judged in the step S21 that the data received from the external apparatus does not represent the data (image data) to be formed on the sheet, the flow advances to a step S22 to cope with the error on the image data generation apparatus side on the output request origin.

In the step S22, it is judged in the image input apparatus (the B/W scanner 100 in this example) to which the remote process is requested whether or not the feeder jam (feeder jam reception) occurs, according as the data received in the step S20 is the error information which is output from the image data generation apparatus side in the step S10 of FIG. 12 and represents that the feeder jam occurs.

If judged in the step S22 that the feeder jam occurs, the flow advances to a step S24 to enable the other job acceptance. For example, the invalidation of the job acceptance from the image data generation apparatus other than the above image data generation apparatus (the B/W scanner 100) is released to set a useful or efficient state, such that the image sent from the apparatus other than the image data generation apparatus in which the error occurred can be printed. Here, the image data generation apparatus such as the color scanner 200, the server computer 800, the PC 900 or the like corresponds to this image data generation apparatus other than the above image data generation apparatus (the B/W scanner 100). When the fax mode is provided, a fax machine capable of communicating with the image forming apparatus is included in this image data generation apparatus other than the above image data generation apparatus. In this case, although the image data transmitted from the image data generation apparatus in which the error occurred is not printed completely, the image printing process instructed by such the image data generation apparatus ends. After the error is eliminated in the step S12 of FIG. 12, it is controlled to restart this job which ended on the way. When other job is accepted and executed on the image formation apparatus side during the period from interruption of that job to restart thereof, it is scheduled to execute the once-interrupted job after the currently executed job ends.

On the other hand, if judged in the step S22 that the feeder jam does not occur, the flow advances to a step S23.

In the step S23, it is judged whether or not memory full of the image input apparatus (the B/W scanner 100 in this case) from which the remote process is requested is received (i.e., whether or not memory-full reception is performed). Such judgment is performed by judging whether or not the data received in the step S20 is the error information output from the image data generation apparatus side in the step S11 of FIG. 12 and representing that the memory full occurs.

If judged in the step S23 that the memory full is received, the flow advances to the step S24 to enable the other job acceptance, and then the flow returns to the step S20. Conversely, if judged in the step S23 that the memory full is not received, the flow directly returns to the step S20.

On the other hand, if judged in the step S20 that there is no data acceptance, the flow advances to a step S25 to judge whether or not other job (e.g., a local copying job, a printing job in a printing standby state or the like when the B/W printer 500 is the MFP) is accepted from the apparatus other than the image input apparatus. If judged in the step S25 that other job is not accepted, the flow returns to the step S20, while if judged that other job is accepted, the flow advances to a step S30 to judge whether or not other job is acceptable. If judged that other job is not acceptable, the flow returns to the step S20, while if judged that other job is acceptable, the flow advances to a step S31 to print other job. Then, the flow advances to a step S32 to wait for printing end. When the printing ends, the flow returns to the step S20.

In the above embodiment, the case where the error occurred on the image data generation apparatus side is the feeder jam and the case where the memory full occurs were explained. However, it is apparent that same method as above is applicable to all errors in the apparatuses. Further, it may be controlled that, on the image data generation apparatus side from which the remote process is requested, according as an operator's cancel instruction or stop instruction is input from the operation unit 2100, information representing the input of such the instruction is output from the image data generation apparatus to the image forming apparatus through the Ethernet 1000, and on the image forming apparatus side an acceptance inhibition state for other job is released according to reception of such the information.

[Other Embodiments]

As described above, the present invention is applicable to a system structured by plural apparatuses (e.g., a host computer, an interface device, a reader, a printer, etc.).

The present invention includes a case where a program code of software to achieve the function of the above embodiment is supplied to a computer in an apparatus or a system connected to various devices to achieve the function of the above embodiment, and the computer (CPU or MPU) in the apparatus or the system actually operates the various devices in accordance with the stored program.

In this case, the program code itself achieves the function of the above embodiment, whereby the program code itself and a means to supply the program code to the computer (e.g., a storage medium storing the program code) constitute the present invention.

As the storage medium for storing such the program code, e.g., a floppy disk, a hard disk, an optical disk, a magnetooptical disk, a CD-ROM, a magnetic tape, a non-volatile memory card, a ROM, or the like can be used.

Further, it is needless to say that the embodiment of the present invention includes the program code not only when the computer executes the supplied program code to achieve the function of the above embodiment, but also when the program code cooperates with an OS (operating system) running on the computer or other application software to achieve the function of the above embodiment.

Further, the present invention includes a case where the supplied program code is once stored in a memory provided in a function expansion board of the computer or a function expansion unit connected to the computer, and a CPU or the like provided in the function expansion board or the function expansion unit executes all or a part of the actual process according to an instruction of the program code, whereby the function of the above embodiment is achieved by such the process.

As explained above, according to the present embodiment, in the system that the plural apparatuses remotely located mutually can perform the data communication through the transmission medium, it is possible to prevent the drawback that, e.g., while the job accepted from one image data generation apparatus is being printed by one image forming apparatus, when an error occurs in this image data generation apparatus, this image forming apparatus keeps being occupied by this error-occurred image data generation apparatus, whereby other jobs can not be accepted, and thus other users can not use this image forming apparatus, traffic increases, and the like. Thus, it is possible to increase productivity of the entire system, smoothly operate the system, and the like. Further, in the case where the above error-occurred image data generation apparatus has selected the clustering mode, it is possible to prevent the drawback that the plural image forming apparatuses keep being occupied by the single image data generation apparatus. Thus, in this case, the above significant effects further rise.

Although the present invention has been explained with the preferred embodiments, the present invention is not limited to these embodiments. Namely, it is obvious that various modifications and changes are possible in the present invention without departing from the spirit and scope of the appended claims.

What is claimed is:

1. An image forming apparatus capable of performing data communication with an image data generation apparatus through a data communication medium, comprising:

reception means for receiving data from said image data generation apparatus through said data communication medium; and control means for invalidating acceptance from other image data generation apparatus when the data from said image data generation apparatus received by said reception means through said data communication medium is image data, and causing to perform a printing process of the image data from said image data generation apparatus, wherein said control means releases the invalidation of acceptance from said other image data generation apparatus, according to whether the data from said image data generation apparatus received by said reception means through said data communication medium is first information output when an error occurs in said image data generation apparatus and representing the error in said image data generation apparatus.

2. An apparatus according to claim 1, wherein said image data generation apparatus has an original reading unit for reading an original.

3. An apparatus according to claim 2, wherein said image data generation apparatus transmits the data to said image forming apparatus every time said original reading unit reads the original.

4. An apparatus according to claim 2, wherein said image data generation apparatus can connect an original feeder unit for feeding the original to said original reading unit, and said image data generation apparatus transmits, according as a feeder jam occurs in said original feeder unit, information representing the occurrence of the feeder jam as the first information to said image forming apparatus through said data transmission medium.

5. An apparatus according to claim 2, wherein said image data generation apparatus transmits, according as memory full occurs in a memory for storing original image data from said original reading unit, information representing the occurrence of the memory full as the first information to said image forming apparatus through said data communication medium.

6. An apparatus according to claim 1, wherein said other image data generation apparatus includes a scanner capable of transmitting image data read by an original reading unit to other remote apparatus through said data communication medium.

7. An apparatus according to claim 1, wherein said other image data generation apparatus includes a host computer.

8. An apparatus according to claim 1, wherein said other image data generation apparatus includes a fax machine.

9. An apparatus according to claim 1, wherein said image data generation apparatus transmits a series of image data to be printed by said image forming apparatus, every predetermined unit through said data communication medium.

10. An apparatus according to claim 1, wherein said image data generation apparatus can select a clustering mode that the image data to be printed is distributed to plural image forming apparatuses through said data communication medium, and said image data generation apparatus transmits, according to the selection of the clustering mode, the image data to the plural image forming apparatus including said image forming apparatus through said data communication medium.

11. An apparatus according to claim 10, wherein, when the clustering mode is selected by said image data generation apparatus, said image data generation apparatus transmits the first information to the plural image forming apparatuses including said image forming apparatus through said data communication medium.

12. A control method for an image forming apparatus capable of performing data communication with an image data generation apparatus through a data communication medium, said method comprising:

a step of receiving data from the image data generation apparatus through the data communication medium;

a step of invalidating acceptance from other image data generation apparatus when the data from the image data generation apparatus received through the data communication medium is image data, and causing to perform a printing process of the image data from the image data generation apparatus; and a step of releasing the invalidation of acceptance from the other image data generation apparatus, according to whether the data from the image data generation apparatus received through the data communication medium is first information output when an error occurs in the image data generation apparatus and representing the error in the image data generation apparatus.

13. A computer-readable storage medium which stores a program to cause an image forming apparatus capable of performing data communication with an image data generation apparatus through a data communication medium to execute:

a step of receiving data from the image data generation apparatus through the data communication medium;

a step of invalidating acceptance from other image data generation apparatus when the data from the image data generation apparatus received through the data communication medium is image data, and causing to perform a printing process of the image data from the image data generation apparatus; and a step of releasing the invalidation of acceptance from the other image data generation apparatus, according to whether the data from the image data generation apparatus received through the data communication medium is first information output when an error occurs in the image data generation apparatus and representing the error in the image data generation apparatus.

14. An image forming system which comprises an image data generation apparatus for reading an original image and generating image data, transmission means for transmitting the image data on a network, and plural image forming apparatuses for printing an image based on the image data, wherein said image data generation apparatus comprises
error detection means for detecting an error in said image data generation apparatus, and
error transmission means for transmitting, when the error is detected by said error detection means, error information to said plural image forming apparatuses through said transmission means, and each of said plural image forming apparatuses comprises
reception means for receiving the error information from said error transmission means through said transmission means, and control means for performing control, when the error information is received by said reception means, to once stop image output of the image information transmitted from said image data generation apparatus and accept a job from other apparatus.

15. A system according to claim 14, wherein said image data generation apparatus comprises an original feed device for feeding an original, and each of said image forming apparatuses comprises first judgment means for judging whether the information received from said image data generation apparatus through said transmission means is the error information, and second judgment means for judging, when the received information is the error information, whether the received information represents a feed error in said original feed device.

16. A system according to claim 14, wherein said image data generation apparatus comprises storage means for storing the original image, and each of said image forming apparatuses comprises first judgment means for judging whether the information received from said image data generation apparatus through said transmission means is the error information, and second judgment means for judging, when the received information is the error information, whether the received information represents a full state of said storage means.

17. A system according to claim 14, further comprising image forming means for performing control, when the information received from said image data generation apparatus is not the error information but the image information, to perform image forming without accepting the job from the other apparatus.

18. An image forming method in an image forming system which comprises an image data generation apparatus for reading an original image and generating image data, a transmission means for transmitting the image data on a network, and plural image forming apparatuses for outputting an image based on the image data, wherein the image data generation apparatus executes an error detection step of detecting an error in the image data generation apparatus, and an error transmission step of transmitting, when the error is detected in said error detection step, error information to the plural image forming apparatuses through the transmission means, and each of the plural image forming apparatuses executes a reception step of receiving the error information transmitted in said error transmission step through the transmission means, and a control step of performing control, when the error information is received in said reception step, to once stop image output of the image information transmitted from the image data generation apparatus and accept a job from other apparatus.

19. A method according to claim 18, wherein said reception step further comprises:

a first judgment step of judging whether the information received from the image data generation apparatus through the transmission means is the error information; and a second judgment step of judging, when the received information is the error information, whether the received information represents a feed error in an original feed device provided in the image data generation apparatus to feed an original.

20. A method according to claim 18, wherein said reception step further comprises:

a first judgment step of judging whether the information received from the image data generation apparatus through the transmission means is the error information; and a second judgment step of judging, when the received information is the error information, whether the received information represents a full state of a storage means provided in the image data generation apparatus to store the original image.

21. A method according to claim 18, further comprising an image forming step of performing control, when the information received from the image data generation apparatus is not the error information but the image information, to perform image forming without accepting the job from the other apparatus.

22. A storage medium which computer-readably stores a program for an image forming method in an image forming system comprising an image data generation apparatus for reading an original image and generating image data, a transmission means for transmitting the image data on a network, and plural image forming apparatuses for outputting an image based on the image data, wherein, according to said program, a computer causes the image data generation apparatus to execute an error detection step of detecting an error in the image data generation apparatus, and an error transmission step of transmitting, when the error is detected in said error detection step, error information to the plural image forming apparatuses through the transmission means, and said computer causes each of the plural image forming apparatuses to execute a reception step of receiving the error information transmitted in said error transmission step through the transmission means, and a control step of performing control, when the error information is received in said reception step, to once stop image output of the image information transmitted from the image data generation apparatus and accept a job from other apparatus.

23. A storage medium according to claim 22, wherein said reception step further comprises:

a first judgment step of judging whether the information received from the image data generation apparatus through the transmission means is the error information; and a second judgment step of judging, when the received information is the error information, whether the received information represents a feed error in an original feed device provided in the image data generation apparatus to feed an original.

24. A storage medium according to claim 22, wherein said reception step further comprises:

a first judgment step of judging whether the information received from the image data generation apparatus through the transmission means is the error information; and a second judgment step of judging, when the received information is the error information, whether the received information represents a full state of a storage means provided in the image data generation apparatus to store the original image.

25. A storage medium according to claim 22, wherein said computer causes each of the plural image forming apparatuses to execute an image forming step of performing control, when the information received from the image data generation apparatus is not the error information but the image information, to perform image forming without accepting the job from the other apparatus.

* * * * *

UNITED STATES PATENT AND TRADEMARK OFFICE
CERTIFICATE OF CORRECTION

PATENT NO. : 6,856,412 B1
DATED : February 15, 2005
INVENTOR(S) : Satoshi Kaneko It is certified that error appears in the above-identified patent and that said Letters Patent is hereby corrected as shown below:

<u>Title page,</u>
Item [57], ABSTRACT,
Line 2, "it enables" should read -- this enables the present invention --.

<u>Column 1,</u>
Line 32, "the" should be deleted.

<u>Column 2,</u>
Line 43, "performs" should read -- perform --.

<u>Column 8,</u>
Line 28, "the" should be deleted;
Line 44, "judged" should read -- judge --; and
Line 60, "such the" should read -- such --.

<u>Column 9,</u>
Line 20, "such the" should read -- such --.

<u>Column 10,</u>
Lines 23 and 31, "such the" should read -- such --;
Line 66, "as" should read -- to whether --.

<u>Column 11,</u>
Lines 22 and 67, "such the" should read -- such --;
Line 65, "as" should read -- to whether --; and <u>Column 12,</u>
Lines 4, 22 and 40, "such the" should read -- such --.

<u>Column 13,</u>
Line 36, "as" should read -- to whether --; and
Line 41, "as" should read -- to whether --.

<u>Column 14,</u>
Line 1, "apparatus" should read -- apparatuses --.

UNITED STATES PATENT AND TRADEMARK OFFICE
CERTIFICATE OF CORRECTION

PATENT NO. : 6,856,412 B1
DATED : February 15, 2005
INVENTOR(S) : Satoshi Kaneko It is certified that error appears in the above-identified patent and that said Letters Patent is hereby corrected as shown below:

Column 15,
Line 5, "other" should read -- the other --.

Column 16,
Line 44, "other" should read -- the other --.

Signed and Sealed this

Twenty-sixth Day of July, 2005

JON W. DUDAS
*Director of the United States Patent and Trademark Office*